(12) United States Patent
Barnas et al.

(10) Patent No.: US 8,531,820 B2
(45) Date of Patent: Sep. 10, 2013

(54) BUS SYSTEM AND MODULE BODY FOR USE THEREIN

(75) Inventors: Jean-Christophe Barnas, Les Pontets (FR); Daniel Thevenin, Morez (FR)

(73) Assignee: Eaton Industries Manufacturing GmbH, Morges (CH)

(*) Notice: Subject to any disclaimer, the term of this patent is extended or adjusted under 35 U.S.C. 154(b) by 262 days.

(21) Appl. No.: 12/993,377

(22) PCT Filed: May 26, 2009

(86) PCT No.: PCT/EP2009/056389
§ 371 (c)(1),
(2), (4) Date: Nov. 29, 2010

(87) PCT Pub. No.: WO2009/153141
PCT Pub. Date: Dec. 23, 2009

(65) Prior Publication Data
US 2011/0075326 A1    Mar. 31, 2011

(30) Foreign Application Priority Data

May 28, 2008    (EP) .................................... 08009714

(51) Int. Cl.
*H02B 1/26*    (2006.01)
(52) U.S. Cl.
USPC ............................ 361/624; 361/636; 361/648
(58) Field of Classification Search
USPC ................. 361/367–640, 644, 648–649, 652, 361/673
See application file for complete search history.

(56) References Cited

U.S. PATENT DOCUMENTS

| 2,942,157 | A | * | 6/1960 | Davis ............................. 361/636 |
| 5,615,079 | A | * | 3/1997 | Eggert et al. .................. 361/637 |
| 5,629,831 | A | * | 5/1997 | Eggert et al. .................. 361/624 |
| 5,745,338 | A | * | 4/1998 | Bartolo et al. ................. 361/637 |
| 6,027,380 | A | * | 2/2000 | Hanning et al. ............... 439/716 |
| 6,317,311 | B1 | * | 11/2001 | Middlehurst et al. ......... 361/637 |
| 6,355,399 | B1 | * | 3/2002 | Sajan et al. .................... 430/311 |
| 6,392,319 | B1 | * | 5/2002 | Zebermann et al. .......... 307/147 |
| 6,452,785 | B1 | * | 9/2002 | Kaaden et al. ................ 361/622 |
| 6,802,737 | B2 | * | 10/2004 | Bergner et al. ............... 439/532 |
| 7,137,829 | B2 | * | 11/2006 | Onizuka et al. ............. 439/76.2 |
| 7,609,528 | B2 | * | 10/2009 | Freimuth et al. ............. 361/801 |
| 2007/0035914 | A1 | | 2/2007 | Birner |

FOREIGN PATENT DOCUMENTS

| DE | 198 06 081 C1 | 6/1999 |
| DE | 10 2006 041 312 A1 | 3/2008 |
| EP | 0 345 851 A1 | 12/1989 |

* cited by examiner

*Primary Examiner* — Gregory Thompson
(74) *Attorney, Agent, or Firm* — Eckert Seamans Cherin & Mallott, LLC; Kirk D. Houser

(57) ABSTRACT

An insulative module body for a bus system has at least two first channels, each adapted for at least partly receiving a bus bar. Each first channel extends through the body along one side thereof, and is open to the outside at one side and at both longitudinal ends thereof. The body has at least two second channels, each adapted for receiving a power connection element for cooperating with a complementary circuit breaker contacting element. Each second channel extends generally transverse to the first channels and is open at one longitudinal end thereof. The first and second channels respectively extend through the body in a first plane and a second plane generally parallel to the first plane and offset therefrom. The first and second channels cross each other in respective parallel, offset planes. The body includes at least one opening for each second channel to connect with one first channel.

14 Claims, 15 Drawing Sheets

BUS SYSTEM AND MODULE BODY FOR USE THEREIN

FIELD OF THE INVENTION

The present invention generally relates to power distribution and more particularly to a bus system for power distribution. More specifically, the present invention provides a modular bus system or a modular distribution breaker system and a module body for use therein.

DESCRIPTION OF THE PRIOR ART

In conventional bus systems, a number of circuit breakers, e. g. ten circuit breakers, may be attached and connected to a bus body in a side-by-side arrangement. Each of the circuit breakers may have two bullet-type plug connectors which are received in corresponding female connectors provided on the bus body. Alternatively, a circuit breaker may be connected to the connectors in the bus body by means of screw connections, solder lugs, bullet/banana connections, threaded terminals, plug-in, or the like. The connector elements in the bus body each have connector points for connecting a bus or a load, respectively. The connector points may be implemented as screw connections, solder lugs, bullet/banana connections, threaded terminals, plug-in, or the like. The individual connector points may be separated from each other by separation walls so as to avoid short circuits or arcing, in particular in higher voltage applications.

If several of the connector points are to be connected to a single pole or phase, a bus bar must be connected to each of the respective connector points. The bus bar must be led outside the compartment formed by the separation walls and then must be led to the next connector point that is to be connected to the same bus bar. Since usually the connector points to be connected are not positioned directly next to each other, the bus bars must form bridges between the respective connector points to be connected, and multiple bus bars must keep a distance from each other in order to avoid short circuits or arcing. To this end, the bus bars need to be bent and shaped, leading to a complicated three-dimensional architecture of the bus bars and bus system. One example of such a conventional bus system is shown in FIG. 12.

It is very difficult and complicated for conventional bus systems to have the ability to provide a mixture of AC and DC distributions inside the same bus system. Further, conventional bus systems are not compact with the bus bar being bent in numerous directions demanding large amounts of space. Further, conventional systems must utilize 'custom-designed' bus bars which are difficult to manufacture due to bending and cutting the bus bars in the desired configuration, involving cut-off losses most of the time, and the bus bars are difficult to change when changes to the system or system design are required (such as additional or different loads with circuit breaker protection).

Another conventional method of power distribution requires the wiring of power supply lines to each circuit breaker individually, which is time consuming and can be voluminous.

US 2007/0035914 A1 shows a current distributor for high currents. A number of circuit breakers may be mounted to a housing in a side-by-side arrangement. The housing is provided with two channels in offset parallel planes. The channels extend through the housing in a transverse direction and accommodate each a main bus bar for current feed and outgoing current respectively. The housing is provided with two set of holes for inserting the two sets of plug-in contacts of the circuit breakers. Each bus bar channel is arranged in a same plane as the holes for the plug-in contacts. In this way, the contacts of the circuit breakers are inserted directly into the bus bars. This modular current distributor is only suitable for single phase application while not allowing mixture of AC and DC. Further, in this known distribution system the bus bar extends interiorly through the housing and exits the housing at one side for feeding power to the bus bar. This may lead to uneven current distribution to the circuit breakers, and thus the loads, along the bus bar, with higher current being available close to the power feeding, and lower current being available at the distal end of the bus bar.

A similar configuration of a distribution module is shown in DE 198 06 081. Also here the configuration of the bus bars in combination with the manner in which the circuit breakers are connected with the bus bars restrict the applicability of the module to single phase AC or DC application.

SUMMARY OF THE INVENTION

The present invention provides a bus system capable of a mixture of AC and DC distributions inside the same bus system in a very compact way using very simple distribution bus bars. Moreover, the bus system is able to accept potential late design changes and allows 'last minute' changes at minimum expenditure, especially with regard to the number of required circuit breakers, the type of circuit breakers (AC or DC) and the load capacity of the bus system.

In particular, the present invention provides a module body as defined in claim 1.

The specific arrangement of the first and second channels crossing each other in the respective parallel, offset planes makes it possible to easily provide a connection between the bus bars on the one hand and the power connection elements on the other hand. Since the bus bars and power connection elements cross each other (i.e. lay above each other) in the offset ("horizontal") planes, it is easy to make a connection in the perpendicular ("vertical") direction plane at the crosspoints where desired. Because of this configuration multiple bus bars can be provided parallel to each other in the same ("horizontal") plane and multiple configurations of single, two or multiple phase, and AC and/or DC application, are possible.

According to a preferred embodiment of the present invention, the third channel extends generally parallel to the second channel. Through this feature, a circuit breaker having parallel complementary contacting elements may easily be connected to power and load connection elements placed in the second and third channels, respectively, especially when bullet-type or banana-type connectors are being used.

Preferably, the number of second channels in said module body is two, three, or five, with a corresponding number of associated third channels. This provides modules adapted for receiving two, three, or five circuit breakers. Of course, any desired number of second and third channels could be provided in the module body for accommodating a corresponding number of circuit breakers.

According to one implementation, which is most preferred at present, combinations of only two similar modules, one for 3 circuit breakers and one for 5 circuit breakers, allow to perform a complete row of circuit breakers with 3, 5, 6, 8 or any desired number of circuit breakers above 8. For example, a modular bus system having a total of 18 circuit breakers could be formed by three 5- breaker modules and one 3-breaker module (or alternatively by six 3-breaker modules). In the unlikely case that 2, 4, or 7 circuit breakers are needed, a 3-breaker module, or a 5-breaker module, or a combination of a 3-breaker module and a 5-breaker module, respectively, could be provided with one space for a circuit breaker being left free.

According to another implementation, combinations of only two similar modules, one for 2 circuit breakers and one for 5 circuit breakers, allow to perform a complete row of circuit breakers with 2, 4, or any desired number of breakers above 4. For example, a modular bus system having a total of 18 circuit breakers could be formed by two 5-breaker modules and four 2-breaker modules (or alternatively by nine 2-breaker modules). According to still another implementation, for maximum flexibility, combinations of three similar modules, one for 2 circuit breakers, one for 3 circuit breakers and one for 5 circuit breakers, allow to perform a complete row of circuit breakers with any desired number of circuit breakers starting from 2 circuit breakers.

It should be noted that not all first channels in all module bodies must receive bus bars. Some of the possible bus bar positions in a module may be left free without affecting or compromising the remaining bus system in any way. This adds to the flexibility and saves contacting parts for those breaker spaces of a module that are not actually used.

It should be noted that not all second and third channels in all module bodies must receive respective power and load connection elements. Some of the possible circuit breaker positions in a module may be left free without affecting or compromising the remaining bus system in any way. Preferably, respective power and load connection elements are received in some or all of said second channels and associated third channels. The module body allows leaving individual circuit breaker spaces free without providing the contacting parts. This adds to the flexibility and saves contacting parts for those breaker spaces of a module that are not actually used. On the other hand, it is also possible to provide a universal power connection element that is adapted to be connected with any one of the bus bars. This universal power connection element could be used in case of repairs or if more or different circuit breakers are necessary later on and adds to the flexibility of possible connections.

According to a preferred implementation, the module body comprises three first channels, each adapted for at least partly receiving a respective bus bar. Preferably, the three first channels are provided parallel to each other in a side-by-side arrangement. By this configuration, three parallel bus bars may be used, for example for three phases of AC, or for three DC buses that may be used for higher current handling capability of the bus system. Also, mixed use with AC and DC, and/or mixed voltages (e. g. 430V AC with 220V AC; 120V AC with 120V DC; 12V DC with 120V DC) is contemplated.

In order to facilitate connection of the upper breaker connector (or power connection element) with a bus bar, the module body comprises an opening connecting the first and second channels. There is at least one opening for each power connecting element, through which opening this power connecting element can be connected with a bus bar. Depending on the application, a circuit breaker can be connected to one or more bus bars, and conversely one bus bar can be connected with one or more circuit breakers. Preferably, for maximum flexibility, there is one opening per bus bar for each power connecting element. For example, if three bus bars are used as mentioned above, there are three openings for each power connecting element.

Through this opening, a screw or any other electrical conducting element may extend from the bus bar to the power connection element. The bus bar and/or power connection element may be provided with a hole for allowing the screw or conducting element to come into close contact therewith. Preferably, the screw is a brass screw that may be self-tapping. If the screw is self-tapping, the hole in the power connection element may be a simple through-hole. Otherwise, a threaded hole may be provided in the power connection element. In this description, the hole in the power connection element is simply referred to as a hole; however, in view of the above explanation, it should be understood that the hole could be a threaded hole, if applicable. Advantageously by means of a screw, the bus bar and the power connection element would also be fixed to the module body. In order to improve the mechanical and electrical connection between the bus bar and the power connection element, a washer made of an electrically conducting material may be placed into the opening and around the screw, and will be clamped by the screw between the bus bar and the power connection element.

If no electrical connection is to be made at the position of the opening, i. e. if the power connection element is not connected to the respective bus bar, the opening may be closed by an dielectric isolating plug so as to avoid any arcing or short circuits and to prevent dust to be accumulated in the cavity formed by the opening over time.

According to another preferred embodiment, the module body comprises a fourth channel for at least partly receiving a further bus bar, said fourth channel extending through said module body along one side thereof generally parallel to said first channel at a position aligned with the interior end of said second channel, said fourth channel being open to the outside at one side and at both longitudinal ends thereof. This feature provides an additional bus bar, for example a DC bus bar in addition to the AC bus bars, or an additional AC bus bar. In case of a DC implementation, if the additional bus bar in the fourth channel is used as a positive bus bar, a bus bar in a first channel could be used a return negative bus bar, or vice versa. The additional bus bar could also be used as the neutral pole or phase for AC applications. For a mixed AC/DC implementation, at least one bus bar provided in a first channel could be for AC use, and at least one bus bar provided in another first channel could be for DC use, with the additional bus bar in the fourth channel also being provided for DC use. As above, if the additional bus bar in the fourth channel is used as a positive bus bar, a bus bar in a first channel could be used a return negative bus bar, or vice versa. In a preferred implementation, the modular bus system of the present invention may use simultaneously a total of four bus bars. For example, three bus bars could be used for different phases of AC, and one bus bar could be used for DC. However, any other combinations of AC and DC are possible. For example, it is also possible to use all four bus bars for DC only. Instead of or in addition to the combinations of AC and/or DC, it is also possible to have combinations of different voltages, either AC, or DC, or mixed AC/DC. There are no specific limitations with regard to AC or DC, or respective voltages, for any of the bus bars.

The additional bus bar is contacted via the end face of the power connection element. Preferably, the module body comprises an opening connecting the second and fourth channels. Similar to the respective connection between the bus bar(s) in the first channel and the respective power connection element(s) as described above, a screw or any electrical conducting element may extend from the additional bus bar in the fourth channel through the opening in the module body to the power connection element, for connecting the additional bus bar with the power connection element. By means of a screw that extends through a hole in the bus bar and into a hole in the power connection element, the additional bus bar and the power connection element would also advantageously be fixed to the module body. In order to improve the mechanical and electrical connection between the additional bus bar and the power connection element, a washer made of an electrically conducting material may be placed into the opening and around the screw, and will be clamped by the screw between the additional bus bar and the power connection element. Also, if no electrical connection is to be made at the position of the opening, a dielectric isolating plug may be placed in the opening so as to avoid any arcing or short circuits and to prevent dust to be accumulated in the cavity formed by the opening over time.

According to another aspect of the present invention, a modular bus system for the distribution of electrical power is provided, and a modular bus system as defined in claim 8.

The connection between a particular circuit breaker and a particular bus bar may be freely chosen by using a corresponding power connection element and by electrically connecting that power connection element to the desired bus bar. The chosen connection may be different for each circuit breaker and in any arbitrary order.

According to another preferred embodiment the module comprises a plurality of auxiliary contacting elements arranged on said module body between said second and third channel for contacting complementary auxiliary contacting elements of a circuit breaker. The module body further has a recess for receiving a printed circuit board that carries said plurality of auxiliary contacting elements on one side thereof as well as one or more connectors on the other side thereof. Not all circuit breakers will have auxiliary contacts, but if such auxiliary contacts are provided, the auxiliary contacts of the circuit breakers provide information about the state of the circuit breaker, i. e. whether the circuit breaker has tripped or not. The auxiliary contacts may include one common contact C, one contact NO for normally open state, and one contact NC for normally closed state. A signal from the auxiliary contacts may be fed to a control unit that may indicate, for example at a remote location, which one of the circuit breakers has tripped. In a preferred arrangement, the circuit breaker could then be remotely reset.

Alternatively, a dual control can be accommodated in the recess in the module body. The dual control carries a plurality of auxiliary contacting elements on one side thereof as well as one or more connectors on the other side thereof. The dual control will be used for sending a control signal to the breaker to trip it when necessary.

Moreover, a visual indicator could be provided on the module body for indicating the state of the attached circuit breaker. The visual indicator could be implemented e. g. as an LED on the front side of the module body, i. e. at the side where the circuit breakers are attached or plugged in, in such a way that it is visible from the outside when the modular bus system is installed and the circuit breakers are placed on the bus system.

Preferably, one LED per circuit breaker would be provided. The LED could illuminate upon a state change (tripping) of the circuit breaker, or the LED could change color (e. g. from green to red) upon a state change (tripping) of the circuit breaker.

For a particularly advantageous mounting arrangement, the modular bus system preferably further comprises at least one mounting rail having first portion for mounting the modular bus system and a second portion for attaching modules to said mounting rail, said first and second portions extending along a respective one of the longitudinal sides of said mounting rail, said module body having at least one fifth channel extending through said module body along one side thereof, said fifth channel being open to the outside at one side and at both longitudinal ends thereof and having a cross-sectional shape corresponding to the cross-sectional shape of said second portion of said mounting rail and receiving said second portion so as to attach said mounting rail and said module body when said mounting rail and said module body are combined by sliding said module body onto said mounting rail, said first portion of said mounting rail extending outside said module body. By providing the module body in the above manner, any desired number of module bodies can be arranged side-by-side on a mounting blade by simply sliding the module bodies onto the mounting blade. Further, the bus bars may be mounted and connected in an easy and flexible manner, providing versatility of the system. Moreover, the module body is very compact.

According to a preferred implementation, the cross-sectional shape of said fifth channel and of said second portion of said mounting rail is generally T-shaped. Such a shape is particularly suited for sliding the module bodies onto the mounting rail, fixing the module body and the mounting rail firmly against any relative movement other that sliding sideways along the mounting rail. Once the module body has reached its intended position on the mounting rail, it may be fixed by dowels to the rail. Of course, other means of attachment may be conceived, such as screws, clamps, or detents.

In a preferred embodiment, the module body comprises two fifth channels arranged on opposite sides of said module body for receiving two mounting rails. By using two mounting rails, the modular bus system may be firmly mounted to a panel, electrical cabinet or other support, reducing any bending moment or other loads that would be applied if only a single mounting rail is used.

Further, the mounting rails may easily be exchanged and replaced. The length of the mounting rails may be chosen according to the number and size of the modules to be attached, and the mounting rails may be cut according to the exact need. Fixing holes in the mounting rails for attaching the mounting rails to a panel, electrical cabinet or other support may be provided according to the exact need depending on the particular application of the modular bus system, without affecting the rest of the modular bus system. When changing the panel, electrical cabinet or other support for the modular bus system, new fixing holes could be drilled and the same mounting rails could be continued to be used. It is also conceivable to provide fixing holes in a certain raster.

As noted above, once the module body is placed in its intended position on the mounting rail, it may be fixed by dowels to the rail. Module bodies may be fixed to the mounting rail so as to secure the module bodies at a certain position along the mounting rail, in order to avoid sliding of the module bodies once their final position on the mounting rail is determined. To this end, each module body may comprise at least one through-hole open to the fifth channel. Preferably, each module body has two such through-holes for each mounting rail located near the lateral side of the module body. It should be understood that in a row of modules on a mounting rail, only the outer modules need to be fixed to the rail as the inner modules would be held therebetween. Hence, a total of two dowels per mounting rail would be sufficient. However, in order to increase the safety against sliding of module bodies on the mounting rail, e. g. in rail applications with a large amount of vibration, two dowels per module body may be used for each mounting rail, for example. The number and location of dowels or other attachment means is not particularly limited. As a default, two through-holes for the dowels may be provided in each module body for each mounting rail, but only the required or desired holes are formed in the mounting rail, and only the required or desired dowels are placed in some or all of the through-holes, depending on the circumstances. The dowels may be formed of spring steel and may be in the form of a longitudinally slotted sleeve. Other materials and forms may be used, such as plastic pins with a press-fit. The relative position of the through-holes in the module bodies and of the holes in the mounting rail may be chosen such that the module bodies on the mounting rails are tightly pressed against each other such that no gap exists between adjacent module bodies. This may be useful to avoid arcing at the interfaces of module bodies.

In order to further avoid arcing at the interfaces of module bodies, in particular in the area of the bus bars, a dielectric paper or foil may be placed in the respective first and/or fourth channel between the channel walls and the bus bar in an area bridging the interface of two adjacent module bodies. Preferably, the first and/or fourth channel(s) in the module body has/have an increased cross section at that area to accommodate the dielectric paper or foil inside the first and/or fourth channel and around the bus bar. Another possibility is to extend the walls of first and/or fourth channel on one side of the module body beyond the side wall of the module body and to provide a corresponding recess on the other side of the module body. In this way, when placing two modules next to each other on a mounting rail, the extended walls of the first and/or fourth channel of one module body are received in the corresponding recess formed in the other module body and there is an overlap of material at the junction of the two adjacent modules.

The modular bus system of the present invention uses very simple copper bus bar shapes, preferably straight simple copper bars having a generally rectangular cross-section. The modular bus system is easy to be mounted in any environment and is flexible to adapt to any desired specifications such as number of breakers, voltage, current capability, etc.

The modular bus system of the present invention may advantageously be used with circuit breakers having a current handling capability of up to 100 A (per circuit breaker). However, smaller or larger versions are conceived. For higher current handling capability, the cross-section (thickness and/or width) of the bus bars may be increased without the need to redesign the bus system.

Alternatively, in the event that only DC is used, bus bars can be connected parallel for handling higher current. Further, the barriers formed between adjacent channels for the bus bars may be modified with regard to height, width and cross-sectional shape, depending on power requirements, in particular to prevent arcing with higher voltage applications. Finally, also the load terminals of two or more breakers can be connected in parallel to provide for higher current.

The modular bus system of the present invention allows for the power feed terminal of the bus bars to be at any location on the bus system, e. g. at the center of the bus bar. This allows more equal power distribution across the bus system compared to conventional bus systems where the power feed terminal is at one side.

By using the parts of the modular bus system of the present invention, all possible configurations of the bus system can be achieved with a small number of different parts that can be assembled and mounted together easily and with no other tools than a simple screwdriver or wrench.

The present invention also allows the easy and fast addition of additional loads/breakers to the system should they be needed, whether during the design, manufacturing or system upgrade.

BRIEF DESCRIPTION OF THE DRAWINGS

Preferred embodiments of the present invention will be explained below in further detail, taking reference to the drawings.

DETAILED DESCRIPTION

Figure 1:
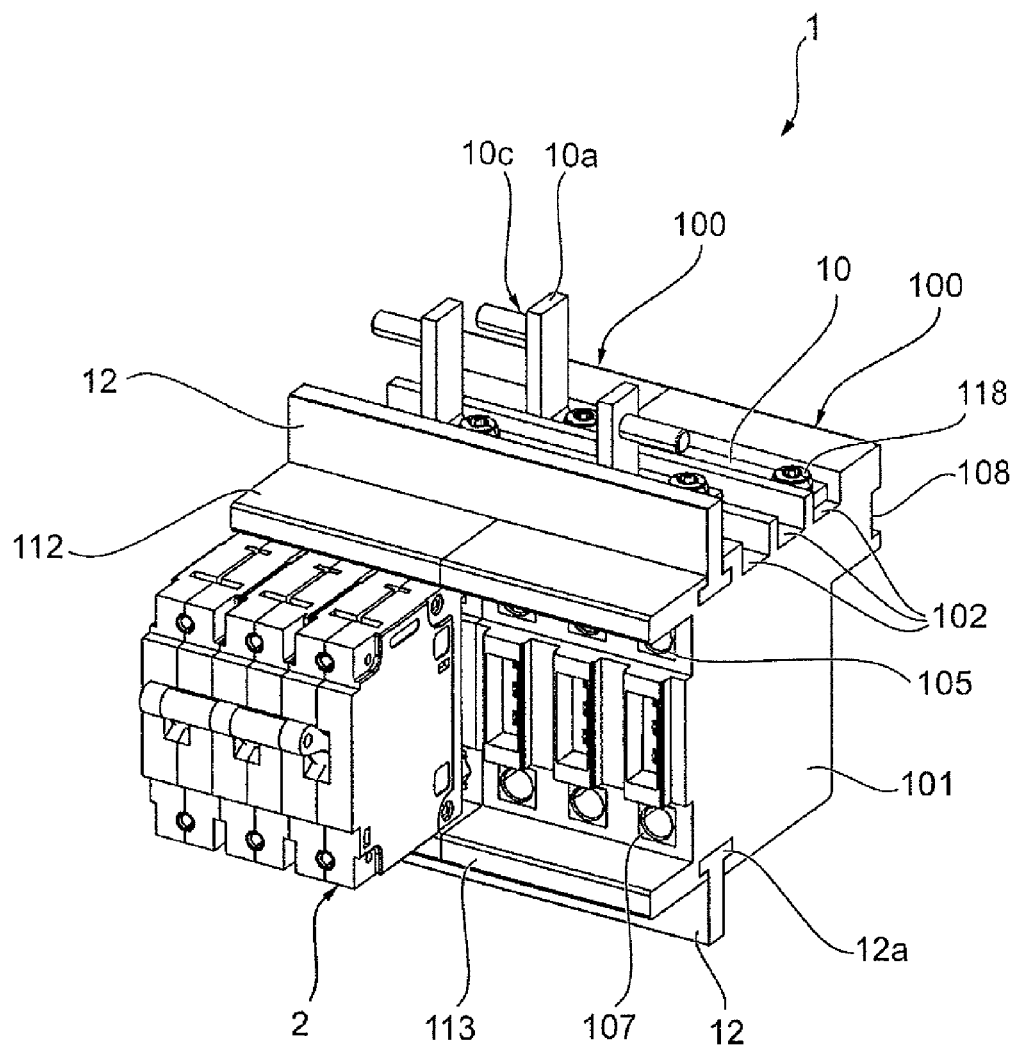
FIG. 1 is a perspective front view of a modular bus system in accordance with the present invention.

In the drawings and in the following description, corresponding parts and components are designated by the same reference numerals.

Figure 2:
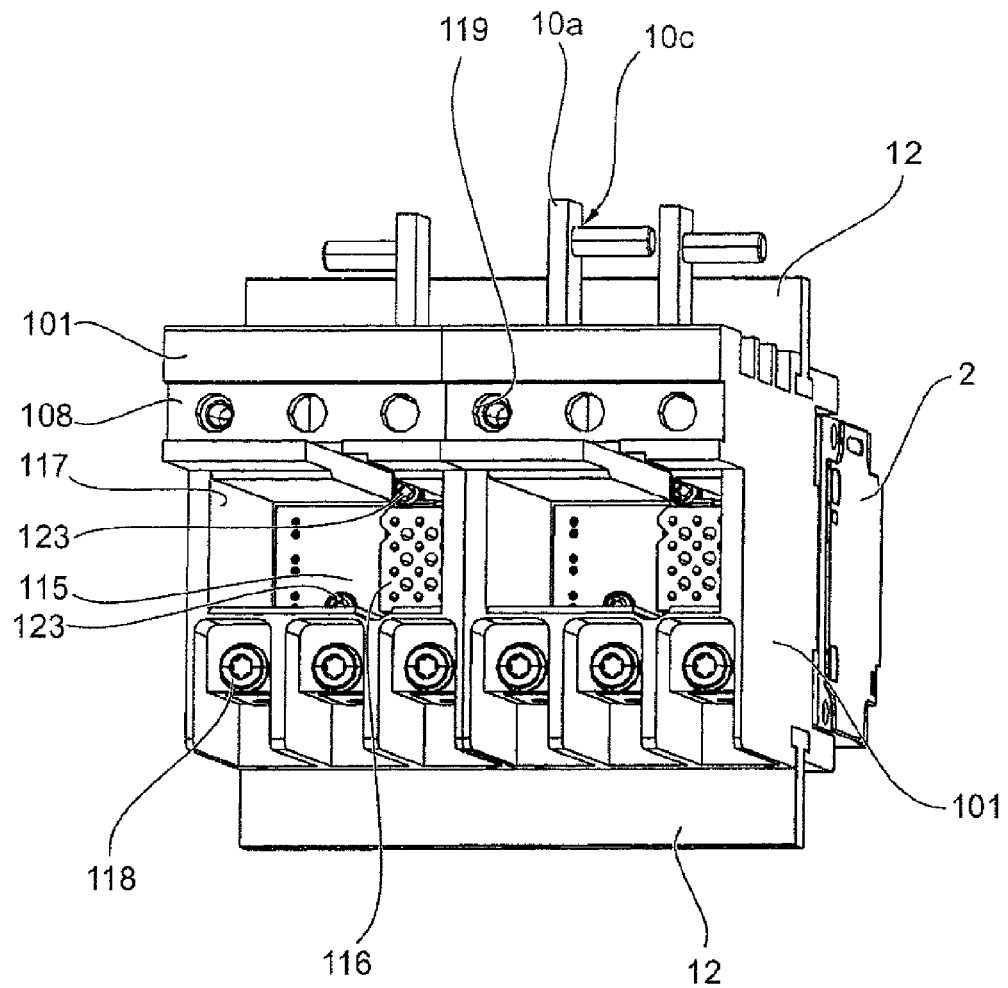
FIG. 2 is a perspective rear view of the modular bus system shown in FIG. 1.
Figure 3:
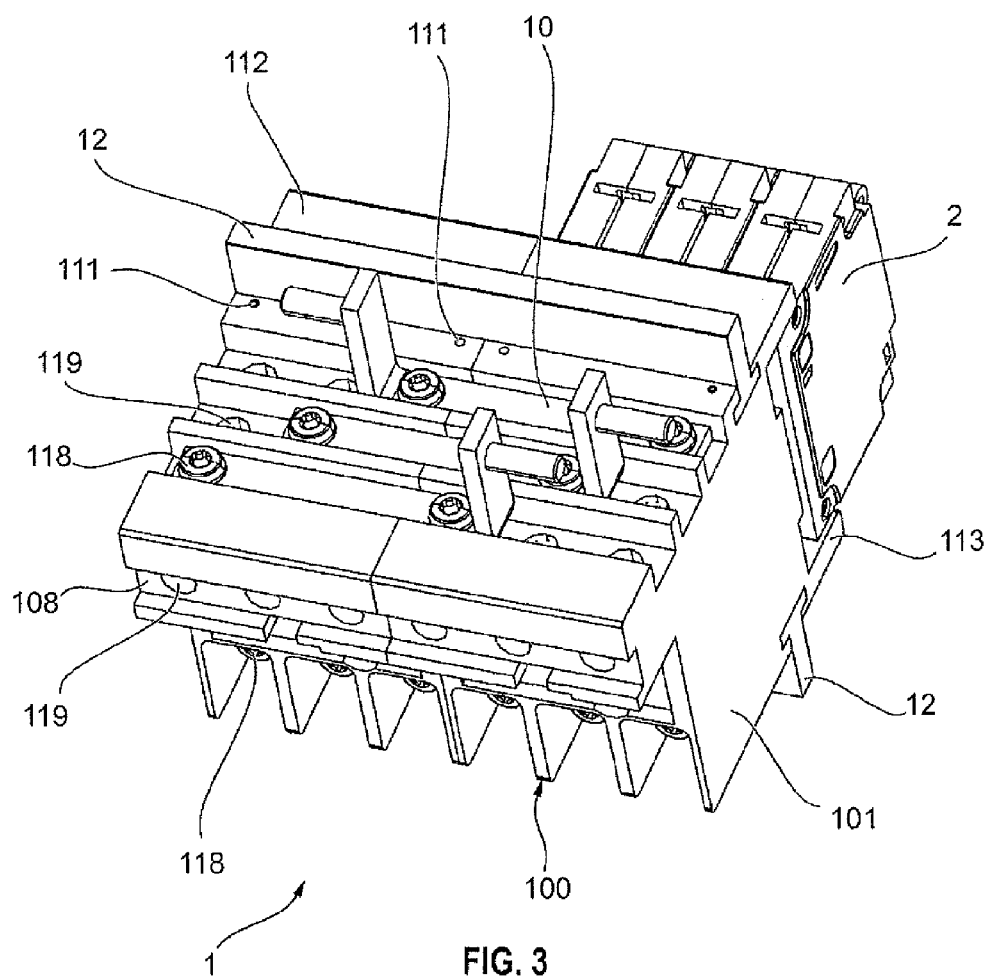
FIG. 3 is a perspective top view of the modular bus system shown in FIGS. 1 and 2.

First taking reference to FIGS. 1-3, a modular bus system 1 in accordance with the present invention is shown in various perspective views. The exemplary embodiment of the modular bus system shown in FIGS. 1-3 comprises two modules 100 adapted to receive or connect up to three circuit breakers each. In FIGS. 1-3, three circuit breakers 2 are connected to one of the modules 100. Each module 100 comprises a module body 101.

Figure 4:
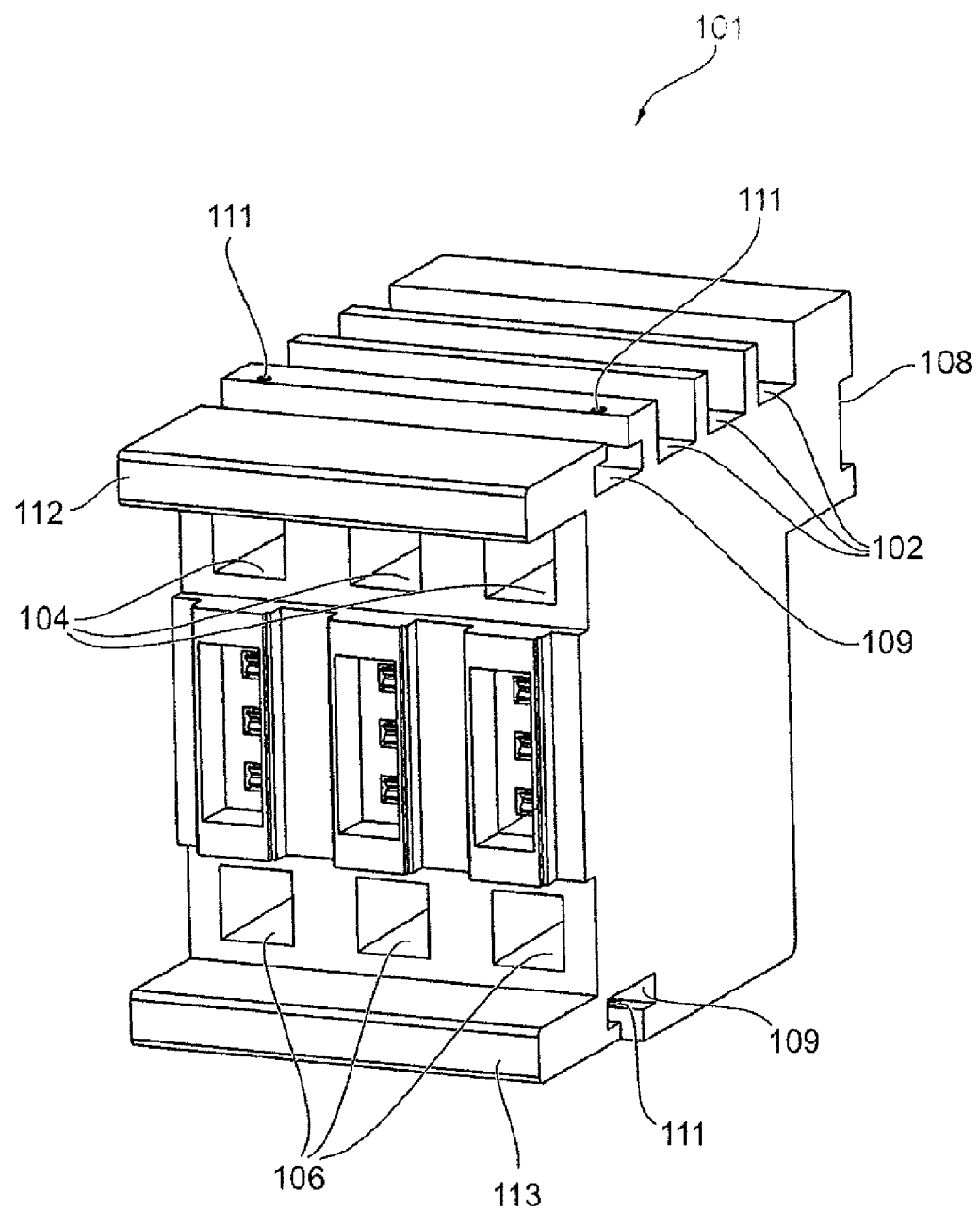
FIG. 4 is a perspective view of a module body in accordance with the present invention.

The module body 101 is shown in more detail in FIG. 4. The module body 101 may be made of plastic using injection molding processes. A preferred material for the module body is polyamide.

Figure 13:
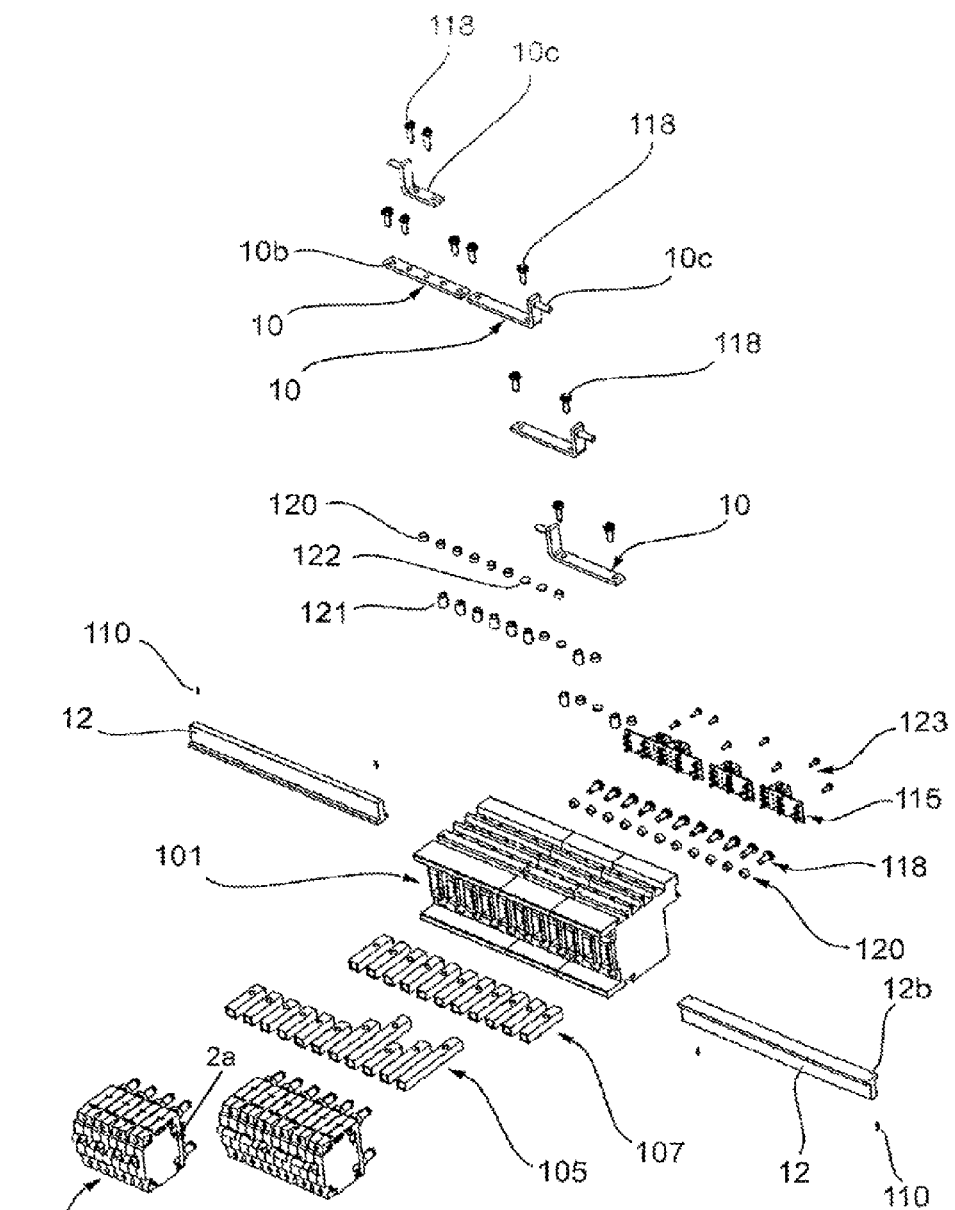
FIG. 13 is an exploded perspective view of a modular bus system in accordance with the present invention, configured with one 5-breaker module and two 3-breaker modules, for a 3-phase application (e. g. DC)
Figure 14:
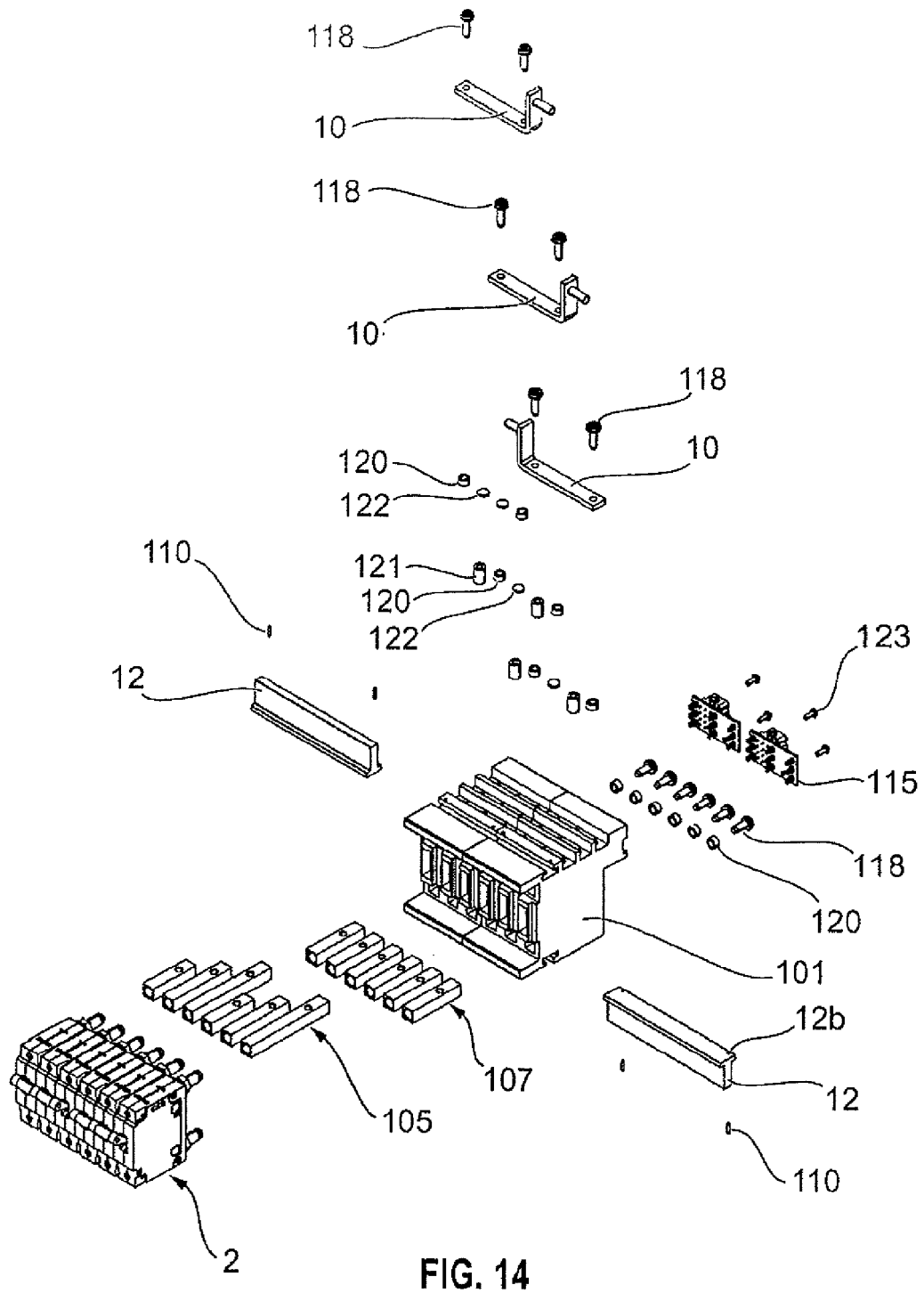
FIG. 14 is an exploded perspective view of a modular bus system in accordance with the present invention, configured with two 3-breaker modules, for a 3-phase application (AC or DC)
Figure 15:
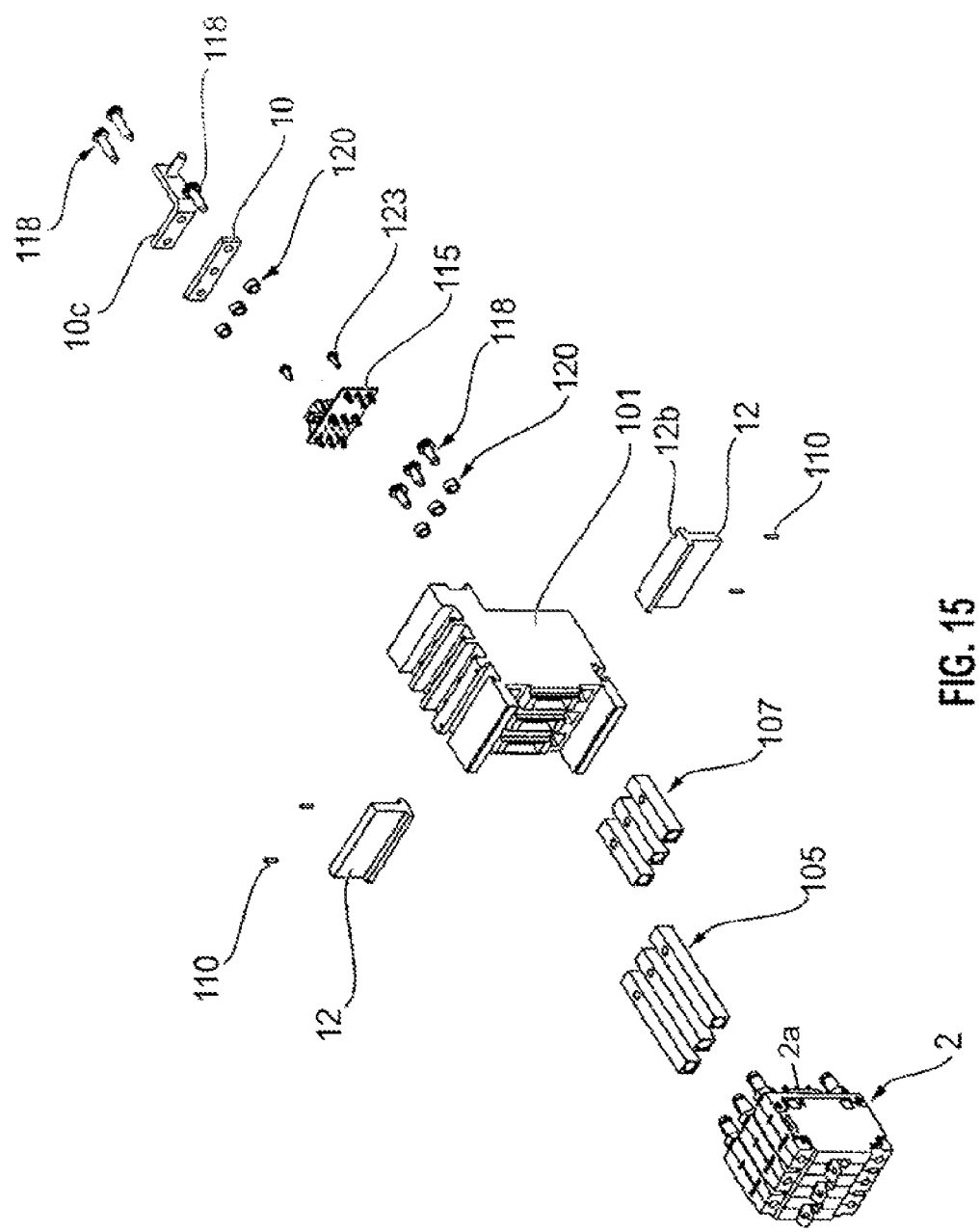
FIG. 15 is an exploded perspective view of a modular bus system in accordance with the present invention, configured with one 3-breaker module, e.g. for DC application, with bus feed connection at the rear of the module body.
Figure 16:
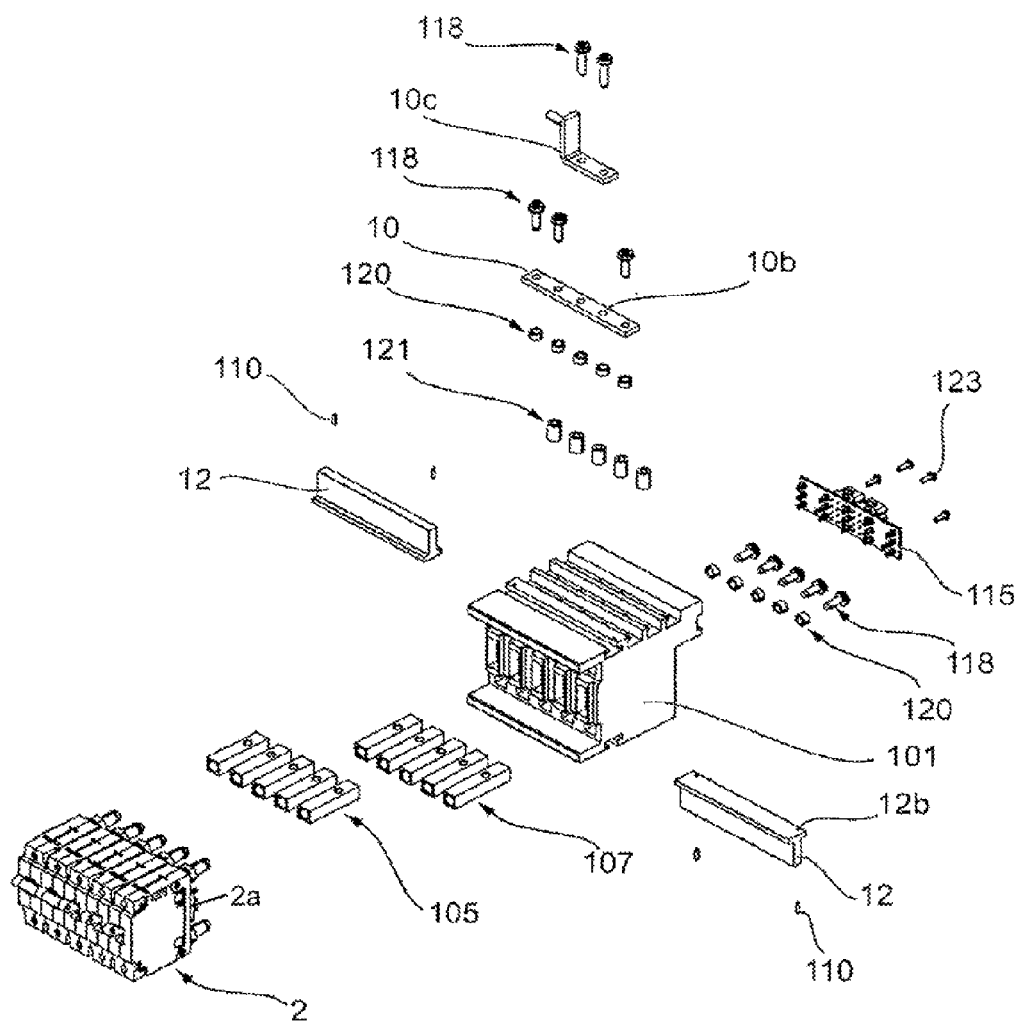
FIG. 16 is an exploded perspective view of a modular bus system in accordance with the present invention, configured with one 5-breaker module, e. g. for DC application, with bus feed connection at the top of the module body.

The module body 101 has, at its top side, three first channels 102 having a generally rectangular cross section, for receiving a respective bus bar 10. In FIG. 1, the bus bar 10 has one end 10a bent upwards to provide a bus feed connection point, such as by screw connection. However, as shown in FIG. 13, the bus bar could be simply a straight bar, and a separate bus feed connection element 10c could be attached to the bus bar 10b, such as by screw connection. Extending through the module body 101 from the front towards the back are three second channels 104 having a generally rectangular cross section, in which respective power connection elements 105 are received. Each of the second channels 104 has associated therewith and parallel thereto a respective third channel 106 having a generally rectangular cross section, in which respective load connection elements 107 are received.

Figure 6:
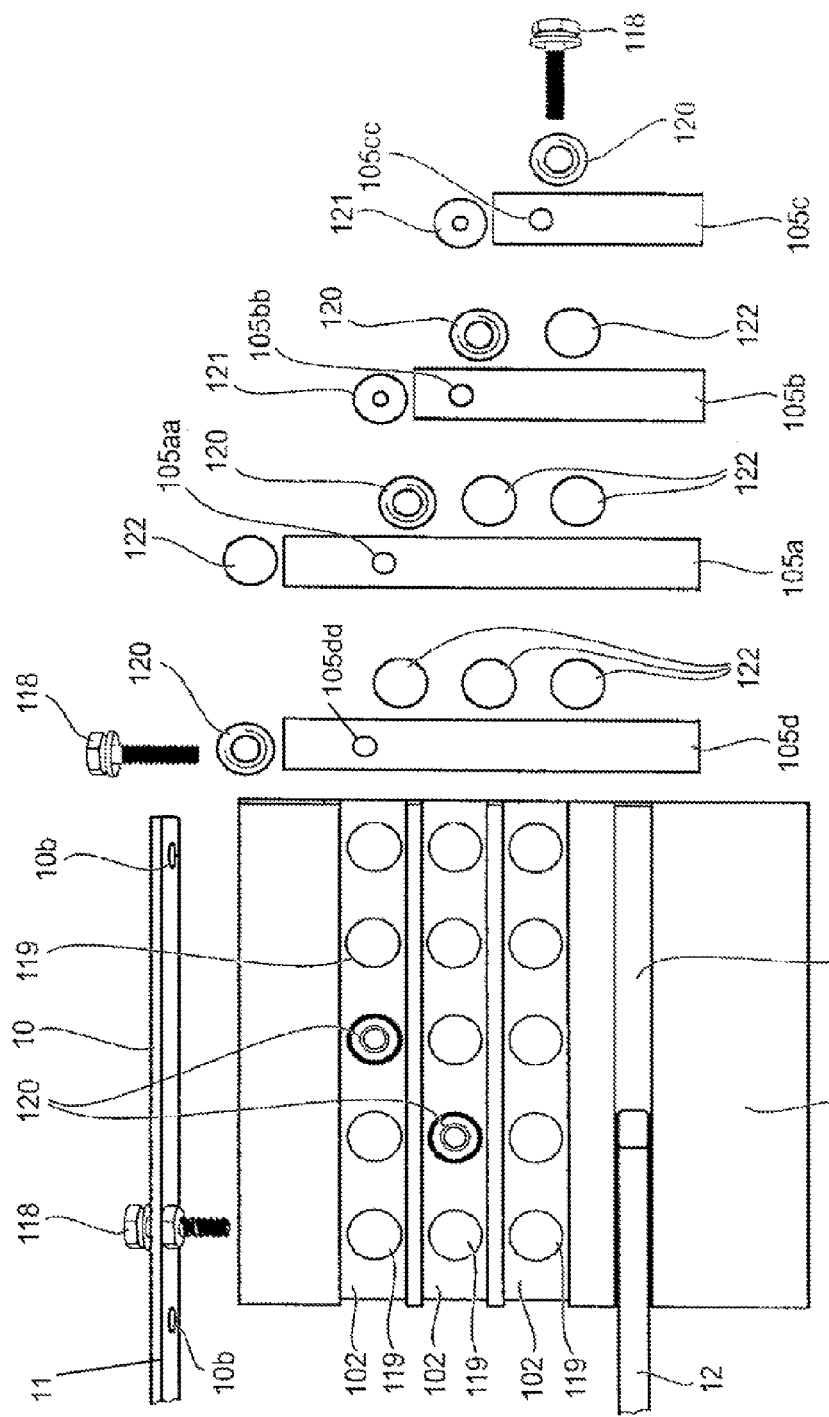
FIG. 6 is a schematic view of components used in the modular bus system of the present invention

The module body 101 further has, at its rear side, one further channel 108 having a Generally rectangular cross section, for receiving an additional bus bar 11 (see FIG. 6). Preferably for DC use.

The modules 100 are held by a mounting rail 12. Specifically, there is each one mounting rail 12 at both the top and at the bottom of the modules 100. The mounting rail 12 has a longitudinal side 12a thereof configured to have a T-shaped cross-section that will fit into a correspondingly shaped fifth channel 109 (see FIG. 4) in each module body 101. In this way, the modules 100 may be slid onto the mounting rails 12. The modules 100 are fixed to the mounting rails 12 by means of dowels 110, see FIGS. 13-16. The dowels are inserted into holes 111 provided in the module body 101 near the fifth channel 109, and extend into corresponding holes 12b (see FIGS. 13-16) provided in the mounting rail 12. The front side of the module body 101 is configured to receive commonly available circuit breakers. Two flanges 112, 113 are arranged at the top and bottom, respectively, of the module body 101 so as to receive therebetween the circuit breakers 2 that are connected to the module 100. However, the flanges 112, 113 are not necessarily required and only help in bringing or maintaining the circuit breakers 2 in their proper position.

The module comprises a plurality of auxiliary contacting elements 114 arranged on said module body 101 between said second and third channel 104, 106 for contacting complementary auxiliary contacting elements 2a of a circuit breaker 2 (see cf. FIG. 7), said module body 101 further having a recess 117 for receiving a printed circuit board 115 that carries said plurality of auxiliary contacting elements 114 on one side thereof as well as one or more connectors 116 on the other side thereof. The printed circuit board 115 is attached to the module body 101 inside the recess 117 by means of screws 123 (see FIGS. 13-16).

Figure 5:
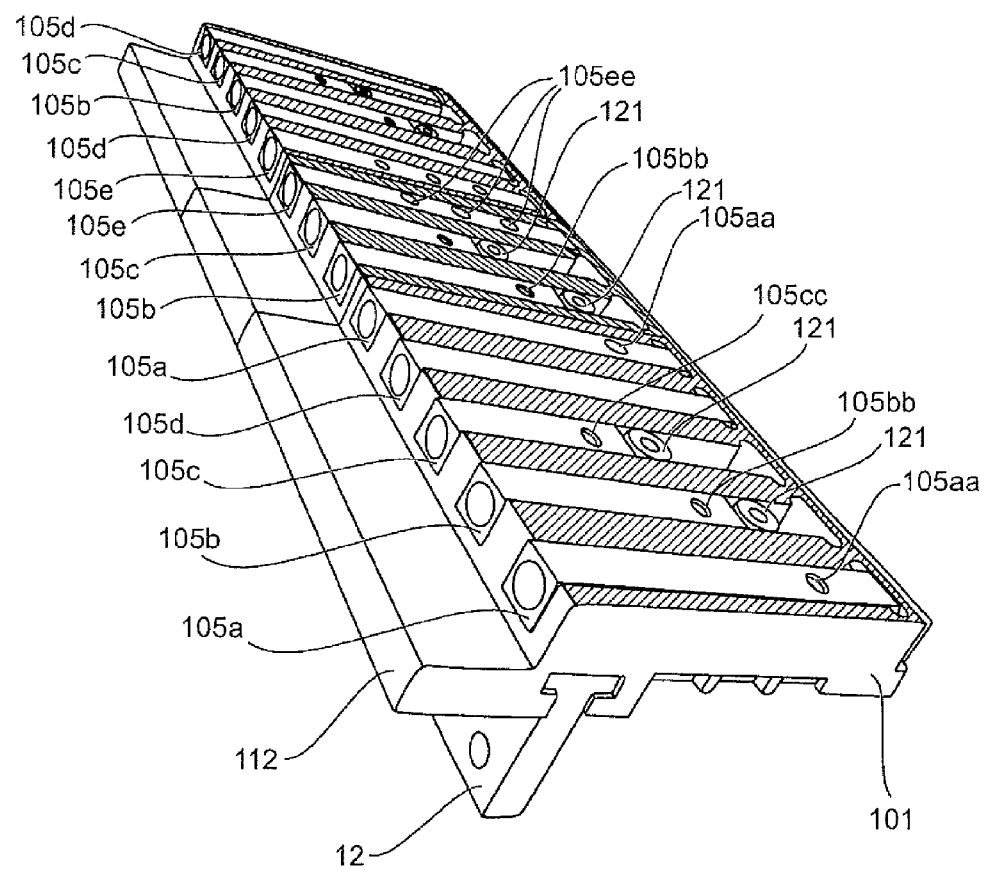
FIG. 5 is a partly broken away sectional perspective view of a modular bus system in accordance with the present invention, showing the upper portion of the module bodies in an upside down orientation, with the power connection elements and a mounting rail inserted.

FIG. 5 shows a partly broken away sectional perspective view of a modular bus system in accordance with the present invention, showing the upper portion of the module bodies in an upside down orientation, with the power connection elements 105 and a mounting rail 12 inserted. For each of the bus bars 10 in the first channels 102 as well as for the additional bus bar 11 in the fourth channel 108, there is a specific power connection element 105.

In order to connect the circuit breaker with the rearmost top bus bar 10, a power connection element 105a is provided that extends all the way into the second channel 104. A hole 105aa is provided in the power connection element 105a at a location where the rearmost bus bar 10 crosses the power connection element 105a. The bus bar 10 is connected to the power connection element 105a by means of a screw 118 which extends through a hole 10b (see FIG. 6) in the bus bar, through an opening 119 in the module body 101, and into the hole 105aa. A metal washer 120 is placed in the opening 119, and the screw 118 extends through the center hole of the metal washer. The metal washer 120 improves the electrical connection between the bus bar 10 and the power connection element 105a.

In order to connect the circuit breaker with the middle top bus bar 10, a power connection element 105b is provided that extends only part of the way into the second channel 104. The power connection element 105b is shorter than the power connection elements 105a. A hole 105bb is provided in the power connection element 105b at a location where the respective middle bus bar 10 crosses the power connection element 105b. The bus bar 10 is connected to the power connection element 105b by means of a screw 118 which extends through a hole 10b (see FIG. 6) in the bus bar, through an opening 119 in the module body 101, and into the hole 105bb. A metal washer 120 is placed in the opening 119, and the screw 118 extends through the center hole of the metal washer. The metal washer 120 improves the electrical connection between the bus bar 10 and the power connection element 105b.

In order to connect the circuit breaker with the foremost top bus bar 10, a power connection element 105c is provided that extends only part of the way into the second channel 104. The power connection element 105c is shorter than the power connection elements 105a and 105b. A hole 105cc is provided in the power connection element 105c at a location where the foremost bus bar 10 crosses the power connection element 105c. The bus bar 10 is connected to the power connection element 105c by means of a screw 118 which extends through a hole 10b (see FIG. 6) in the bus bar, through an opening 119 in the 20 module body 101, and into the hole 105cc. A metal washer 120 is placed in the opening 119, and the screw 118 extends through the center hole of the metal washer. The metal washer 120 improves the electrical connection between the bus bar 10 and the power connection element 105c.

In order to connect the circuit breaker with the additional rear bus bar 11, a power connection element 105d is provided that extends all the way into the second channel 104. The power connection element 105d is generally similar to the power connection element 105a. However, instead of the hole 105aa, a hole 105dd is provided in the end face of the power connection element 105d facing the interior of the second channel 104, at a location where the additional rear bus bar 11 crosses the power connection element 105d. The bus bar 11 is connected to the power connection element 105d by means of a screw 118 which extends through a hole 10b (see FIG. 6) in the bus bar, through an opening 119 in the module body 101, and into the hole 105dd. A metal washer 120 is placed in the opening 119, and the screw 118 extends through the center hole of the metal washer. The metal washer 120 improves the electrical connection between the bus bar 10 and the power connection element 105d.

In order to position the power connection elements 105b and 105c at a location within the second channel 104 where their hole 105bb, 105cc is aligned with the opening 119 and the hole 10b in the respective bus bar 10, a stopper 121 may be used. Preferably, the stopper 121 is a tubular plastic body with the outer diametric dimension being slightly larger than the distance between the side walls of the second channel 104, such that the stopper 121 may be press fit into the second channel 104. For assembly of the modular bus system, the stopper 121 is inserted into the second channel 104 from the front and is pushed further into the second channel by the power connection element 105b, 105c until the trailing end of the power connection element 105b, 105c is flush with the front side of the module body 101 at the open end of the second channel 104. This is the correct position for connecting the power connection element 105b, 105c to the respective bus bar 10 via the screw 118. Of course, other means for positioning the power connection element 105b, 105c in the second channel 104 may be used, such as a press fit between the second channel 104 and the power connection element 105b, 105c. While less convenient, the modular bus system 1 may also be assembled without any such stopper or positioning means.

If no electrical connection is to be made at the position of the opening 119, i. e. if the power connection element is not connected to the respective bus bar, the opening 119 may be closed by an dielectric isolating plug 122 (see FIG. 6) so as to avoid any arcing or short circuits and to prevent dust to be accumulated in the cavity formed by the opening 119 over time.

In order to connect the circuit breaker to a load, a load connection element 107 is provided that extends all the way into a third channel 106. At the front side the channel 106 is open for receiving the load connection element 107 (see FIGS. 1 and 4). The lower bullet-type plug connector of the circuit breaker 2 is placed in the load connection element 107. At the rear side of the module as shown in FIG. 2, the third channel 106 is substantially closed. By means of a screw 118 the load connection element 107 is attached to the module body 101. This screw 118 with associated washer 120 can also be used to attach a load lug in order to connect a load to an selected circuit breaker. Separation walls are provided between load terminals of adjoining poles in order to prevent arcing.

Figure 7:
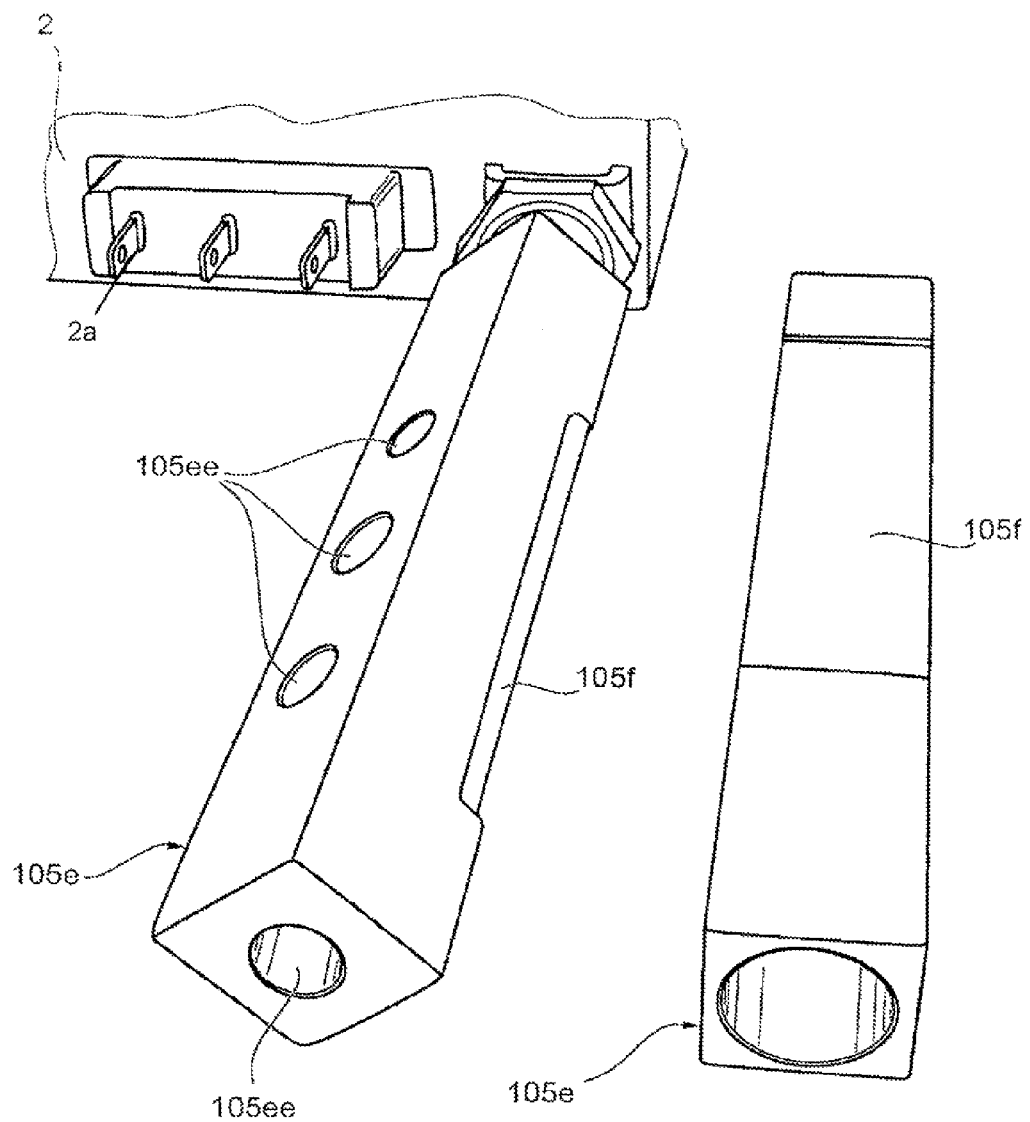
FIG. 7 is a perspective view of a universal power connection element that may be used in the modular bus system of the present invention.

If a particular circuit breaker position on a module is not used, the power and load connection elements at that position may be omitted in order to save on parts and costs, or otherwise a universal power connection element 105e may be used. An example of such a universal power connection element 105e is shown in FIG. 7. In the left part of said figure, the universal power connection element 105e is shown connected to a circuit breaker and in a slightly tilted position in order to better show the details. In the right part of said figure, the universal power connection element 105e is shown in a longitudinally reversed position, i. e. with the portion to which the circuit breaker connects facing the viewer. The universal power connection element 105e comprises four holes 105ee that may be connected to a corresponding bus bar 10 or 11 as needed. This is advantageous in case of repairs or modifications to the modular bus system after a first configuration. It is also possible to electrically connect two or more bus bars with each other using one or more of the universal power connection elements.

When the universal power connection element 105e is provided in the second channel 104, but is not connected to either one of the bus bars 10, the universal power connection element 105e should be placed in the second channel 104 with the holes 105ee in the long side of the universal power connection element 105e facing away from the openings 109. On the side opposite to where the holes 105ee are placed in the long side of the universal power connection element 105e, the universal power connection element 105e may comprise an additional insulation 105f which then faces the openings 109 (with the dielectric isolating plugs 122 therein), improving the protection against arcing.

Similarly if particular first channels are not used by a bus bar, e.g. for a single phase application, the bus bars at that positions may be omitted in order to save parts and cost. It is still possible to change later from a single phase to a 3-phase application by sliding two bus bars into the empty first channels and making the required connections with the power connection elements.

Figure 8:
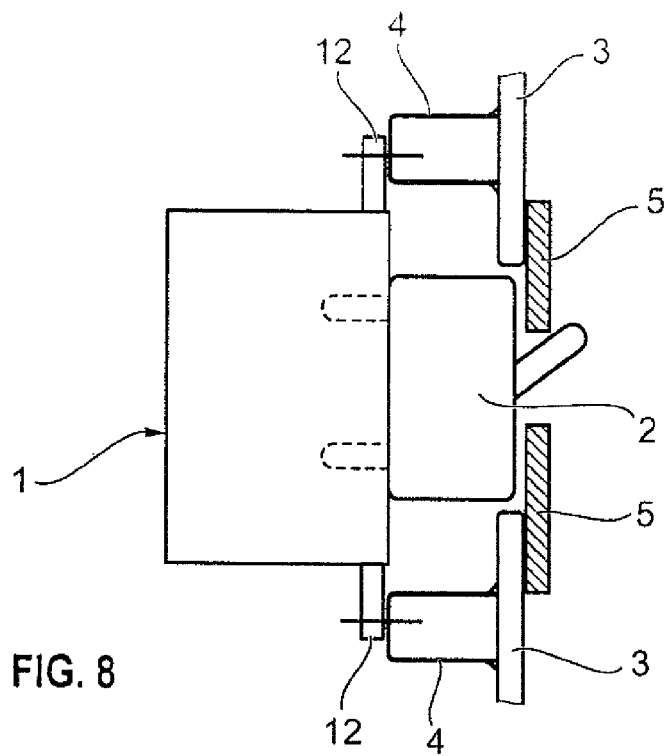
FIG. 8 is a schematic sectional view of particular exemplary application of the modular bus system of the present invention.

Turning to FIG. 8, in order to mount the modular bus system 1 of the present invention to a front plate 3, for example in an electrical cabinet or box, U-shaped mounting elements 4 may be attached to a front plate 3, such as by welding or screw connection, and the mounting rails 12 of the modular bus system 1 may be attached to the U-shaped mounting elements 4, e. g. by screws. In order to secure the circuit breakers 2 to the modular bus system 1, a fixing rail or plate 5 may be attached to the front plate 3.

Figure 9:
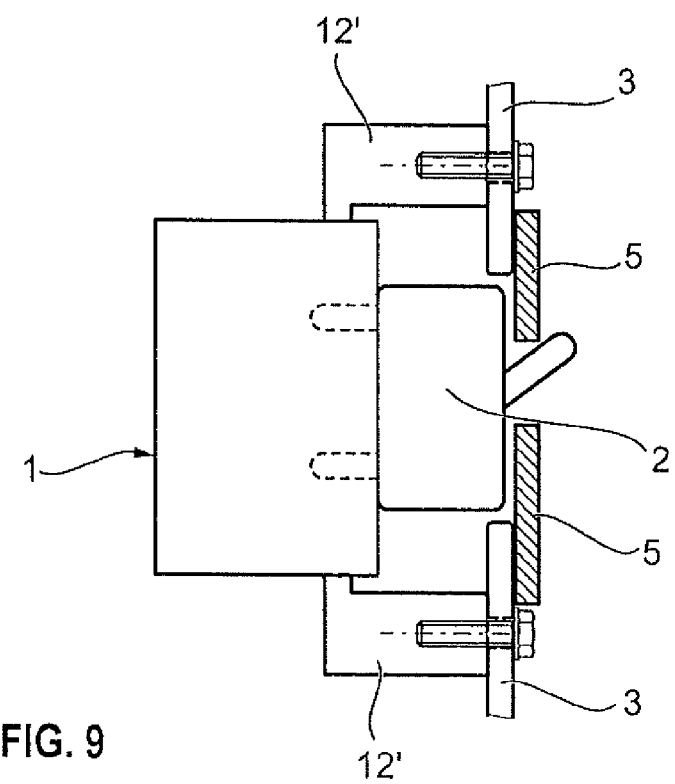
FIG. 9 is a schematic sectional view of another particular exemplary application of the modular bus system of the present invention.

Alternatively, as shown in FIG. 9, a modified mounting bracket 12' may be used so as to provide support for the front plate 3. The alternative mounting bracket 12' is generally L-shaped and provides threaded holes for a front plate 3 to be mounted in such a position that a fixing plate 5 may be placed over the circuit breakers 2 so as to secure them to the modular bus system 1.

Instead of using a mounting rail as shown in FIG. 8 and FIG. 9, the module body 101 itself, or generally the module bus system 1, can be extended, e. g. at its front or back side, so as to be mounted to a panel, electrical cabinet or other support using screws or other fixing means. Alternatively, the modular bus system of the present invention can be mounted to a panel, electrical cabinet or other support using an integrated DIN rail connection (integrated into the module 100), or a DIN rail adapter screwed to the back of the module 100.

Furthermore, the modular bus system 1 can be provided with a protective cover, which extends over the modules 100. The cover can be mounted to the modular bus system 1 by means of a snap-fit and/or screws. The cover will offer a safety means for people having access to the modular bus system 1 and at the same time keep the modular bus system 1 free from any debris, dust or other particles that may influence the working of the modular bus system 1.

Figure 10:
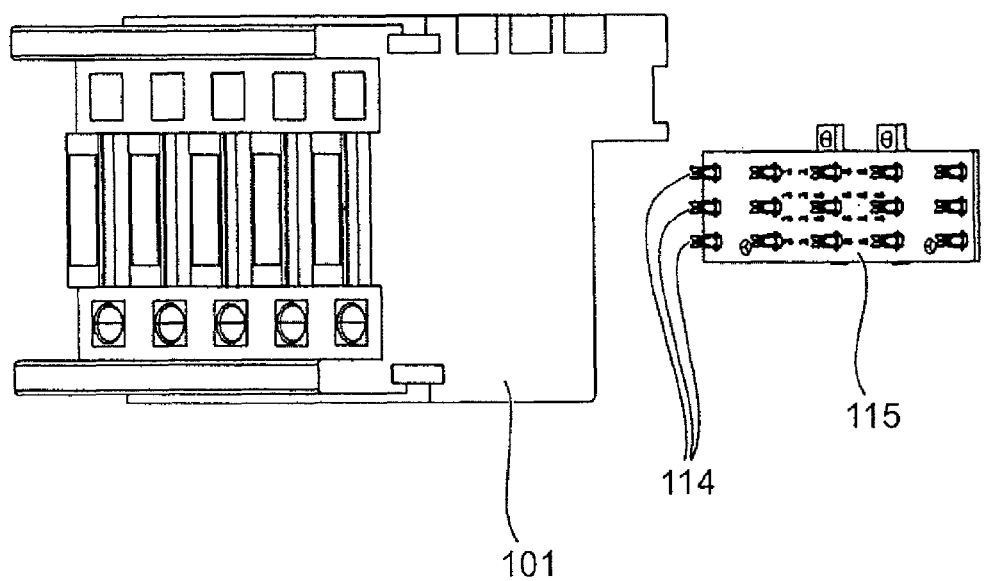
FIG. 10 is an perspective view of a 5-breaker module body in accordance with the present invention, showing also a circuit board for auxiliary breaker contacting elements, to be placed inside the module body.
Figure 11:
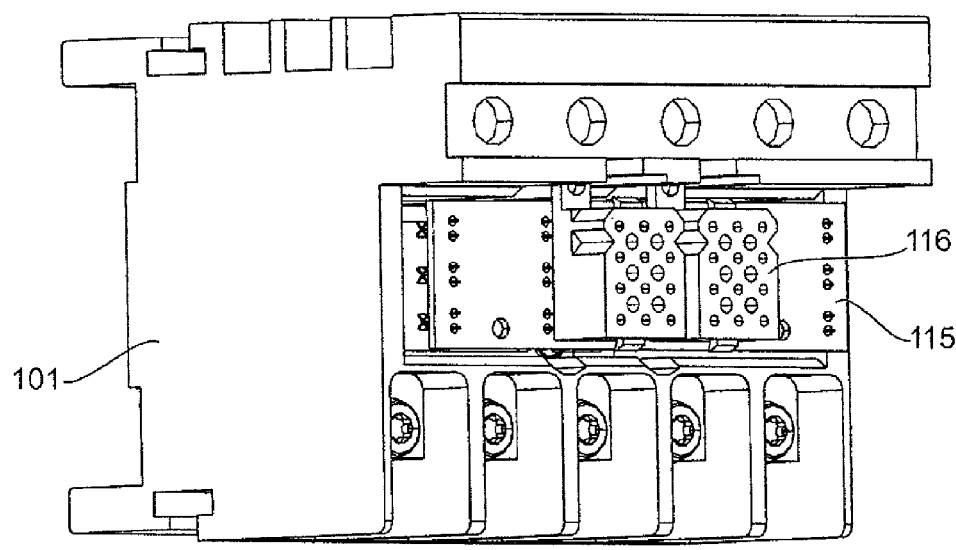
FIG. 11 is another perspective view of the 5-breaker module body shown in FIG. 10, with the circuit board placed just outside the recess into which it would be inserted in a fully assembled state.
Figure 12:
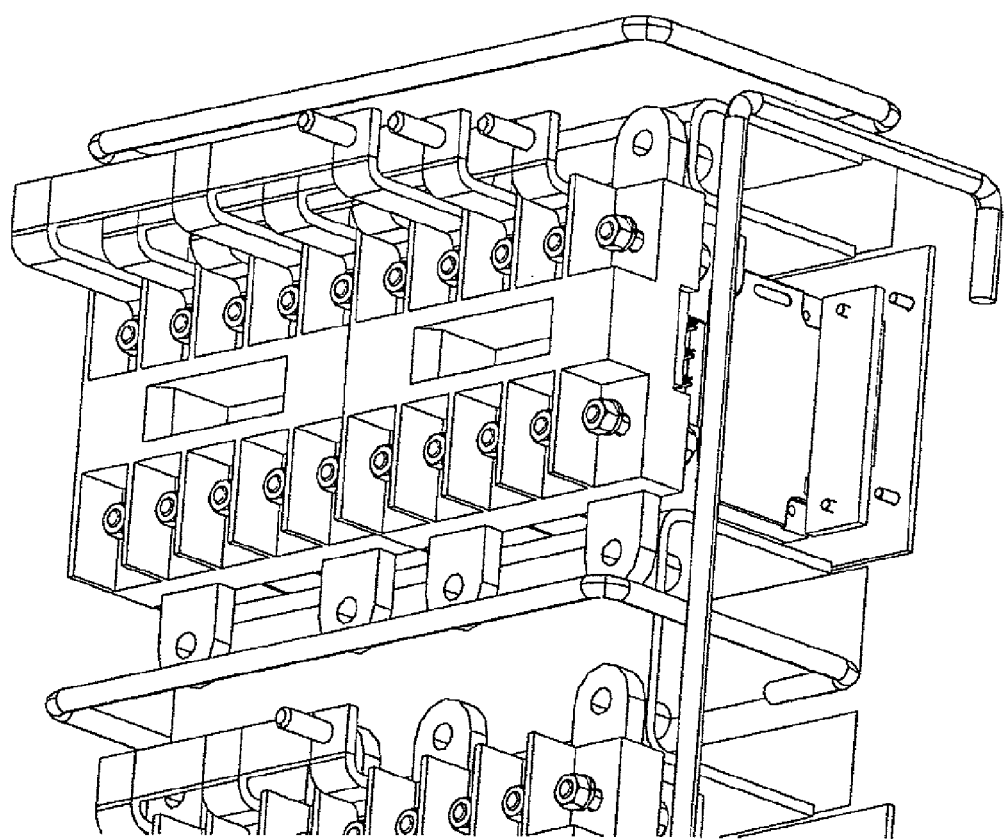
FIG. 12 is a perspective partial view of a conventional electrical bus distribution system showing conventional bus bars.

FIG. 10 shows a 5-breaker module body 101, and a circuit board 115 for auxiliary breaker contacting elements 114, to be placed inside the module body 101. FIG. 11 shows the 5-breaker module body 101 and one or more connectors 116, with the circuit board 115 placed just outside the recess 117 (FIG. 2) into which it would be inserted in a fully assembled state.

Industrial Applicability

The module body and modular bus system of the present invention may find advantageous application in railway trains, on ships, in telecommunications, in AC/DC applications, in military applications, and wherever flexibility of a bus design is needed. While particularly suited for the distribution of power, it is not limited thereto and may be used e. g. for switching of signals.

The invention claimed is:

1. A module body for the distribution of electrical power, said module body being made of an insulating material; said module body having at least two first channels, each adapted for at least partly receiving a bus bar, each first channel extending through said module body along one side thereof being open to the outside at one side and at both longitudinal ends thereof; said module body having at least two second channels, each adapted for receiving a power connection element for cooperating with a first complementary contacting element of a circuit breaker, each second channel extending generally transverse to said first channels and being open at one longitudinal end thereof, wherein said first channels extend through said module body in a first plane, and wherein said second channels extend through said module body in a second plane, said second plane being generally parallel to said first plane and offset from said first plane, said first and second channels crossing each other in the respective parallel, offset planes; and wherein said module body comprises at least one opening for each second channel, through which opening said second channel connects with one first channel.

2. The module body according to claim 1, wherein said module body has at least two third channels, each adapted for receiving a load connection element for cooperating with a second complementary contacting element of a circuit breaker, each third channel being open at one longitudinal end thereof and extending generally parallel to said second channels.

3. The module body according to claim 1, wherein said at least two second channels in said module body is two, three, or five second channels; and wherein said module body has a corresponding number of two, three, or five associated third channels.

4. The module body according to claim 1, wherein said module body comprises three first channels, each adapted for at least partly receiving a respective bus bar.

5. The module body according to claim 2, wherein said module body comprises a fourth channel for at least partly receiving a further bus bar, said fourth channel extending through said module body along one side thereof generally parallel to one of said at least two first channels at a position aligned with the interior end of one of said at least two second channels, said fourth channel being open to the outside at one side and at both longitudinal ends thereof.

6. The module body according to claim 5, wherein said module body comprises at least one opening for each second channel, through which opening the second channel connects with the fourth channel.

7. A bus system for the distribution of electrical power, said system comprising:
   at least one bus bar, said bus bar having a generally elongate linear configuration and a generally rectangular cross-section; and
   at least one module, said module comprising:
     the module body according to claim 1, and
       at least two power connection elements, each adapted for cooperating with a first complementary contacting element of a circuit breaker, wherein each power connection element is electrically connected to said bus bar,
wherein the bus bar is received in one of the first channels of the module body.

8. The bus system according to claim 7, wherein said at least one bus bar is a plurality of bus bars, wherein one of said power connection elements is electrically connected to a first bus bar, and wherein another of said power connection elements is electrically connected to a second bus bar.

9. The bus system according to claim 7, wherein said power connection element is electrically connected to said bus bar at a selected location where the bus bar crosses the power connection element by an electrically conducting element, which extends through the opening in the module body.

10. The bus system according to claim 7, wherein said opening through which said each second channel connects with said one first channel in the module body is closed by a dielectric isolating plug if the power connection element is not connected to the respective bus bar.

11. The bus system according to claim 7, wherein said module comprises a plurality of third channels and a plurality of auxiliary contacting elements arranged on said module body between said second and third channels for contacting complementary auxiliary contacting elements of a circuit breaker, said module body further having a recess for receiving either a printed circuit board or a dual control that carries said plurality of auxiliary contacting elements on one side thereof as well as one or more connectors on the other side thereof.

12. The bus system according to claim 7, wherein the bus system further comprises at least one mounting rail having a first portion for mounting the bus system and a second portion for attaching modules to said mounting rail, said first and second portions extending along a respective one of the longitudinal sides of said mounting rail, said module body having at least one fifth channel extending through said module body along one side thereof, said fifth channel being open to the outside at one side and at both longitudinal ends thereof and having a cross-sectional shape corresponding to the cross-sectional shape of said second portion of said mounting rail and receiving said second portion so as to attach said mounting rail and said module body when said mounting rail and said module body are combined by sliding said module body onto said mounting rail, said first portion of said mounting rail extending outside said module body.

13. The bus system according to claim 12, wherein the cross-sectional shape of said fifth channel and of said second portion of said mounting rail is generally T-shaped.

14. The bus system according to claim 12, wherein said module body comprises two fifth channels arranged on opposite sides of said module body each adapted for receiving a mounting rail.

* * * * *